Feb. 5, 1952  A. M. STONER  2,584,303
TOGGLE-ACTING COLLET AND METHOD OF MAKING SAME
Filed Dec. 31, 1947

*INVENTOR.*
ARTHUR MERRICK STONER
BY
*E. W. Marshall*
*ATTORNEY.*

Patented Feb. 5, 1952

2,584,303

UNITED STATES PATENT OFFICE 2,584,303

TOGGLE-ACTING COLLET AND METHOD OF MAKING SAME

Arthur Merrick Stoner, West Hartford, Conn., assignor to The Jacobs Manufacturing Company, Hartford, Conn., a corporation of Connecticut Application December 31, 1947, Serial No. 794,893

5 Claims. (Cl. 279—46)

This invention relates to an improvement in the construction of toggle-acting collets and to the method of making them. In my copending applications—Serial No. 702,165, filed October 9, 1946, for Bit Brace, now abandoned and my application Serial No. 794,892 for Toggle-Acting Collet, filed December 31, 1947, now Patent No. 2,546,351, of which this application is an improvement, I have shown a collet in which the gripping members are tilted by the torque imposed upon them by the rotation of the chuck in which they are used and the opposition to this rotation by the engagement of a tool held between the gripping members with a workpiece, whereby a toggle or self-tightening action is effected which automatically increases the pressure of the gripping members upon the tool.

In the aforesaid applications I have shown the gripping members provided with a tool-engaging projection or rib offset from an inner gripping edge which, by engagement with the tool, arrests the degree of tilting from the gripping members to prevent them from passing beyond the dead center of the toggle.

In developing toggle-acting collets I have discovered that the gripping members may be constructed without the projections or ribs and in such a manner that the maximum torque imposed upon them will not tilt them beyond the desired critical angle. The purpose of the present application is to disclose and claim the manner in which this result may be attained.

Referring to the drawings,

Fig. 1 is a front elevation, more or less diagrammatical, of a collet with three gripping members which is made according to and embodies this invention;

Fig. 2 is a side elevation of one of the gripping members shown in Fig. 1. As more fully described in the aforesaid applications, the gripping members are resiliently interconnected preferably by a body of oil-resistant synthetic rubber, which passes through openings in the members as shown in section in Fig. 2, and which forms foldable spanning struts between adjacent gripping members, shown in Fig. 1;

Figure 1:
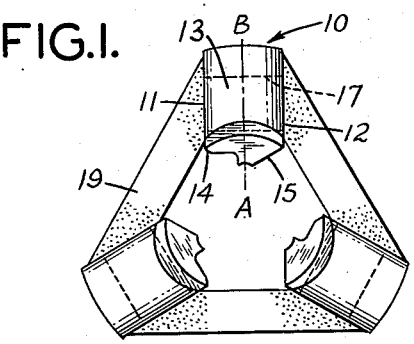
Figure 2:
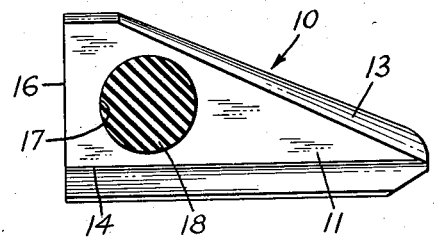

In Figs. 1–5, the gripping member is designated by the reference numeral 10. This is a body of metal or other hard material, which is wedge-shaped in side elevation (Fig. 2). In the particular embodiment shown in Figs. 1–6, it has flat parallel sides 11, 12, equally spaced from a median plane represented by the line A—B. Its outer surface 13 is in the form of the curved face of a segment of a truncated cone. Its inner portion is formed by two surfaces 14, 15, in planes which intersect on a line parallel to the axis of rotation of the collet of which they form a part. The rear end 16 is in a plane normal to this axis of rotation. 17 designates a transverse opening through the member. As shown in Figs. 1 and 2, the gripping members are inter-connected by a body of oil-resistant synthetic rubber, which passes through the openings in the gripping members, as shown at section 18 in Fig. 2, and forms foldable struts 19 between adjacent members (Fig. 1). This body holds the members angularly spaced, and when not subjected to torque, radially disposed about the axis of rotation.

In constructing a collet of this type it has been customary to assemble the parts and thereafter to grind off a section 22 formed at the intersections of the surfaces in the planes 14, 15, thus forming arcuate gripping surfaces terminating in spaced edges 20, 21. Variations in machining or assembling the parts will result in the distances between the edges 20 and central radial planes through their respective gripping members being irregular, so that the toggle action of the gripping members upon an interposed tool will be relatively irregular.

Figure 3:
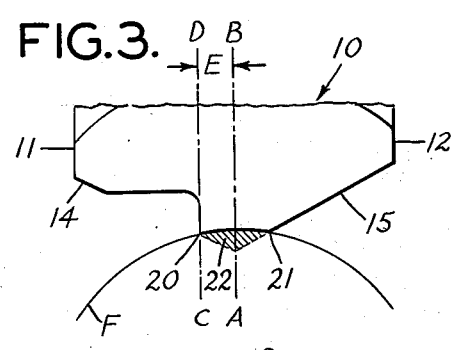
Figs. 3 and 4 are magnified diagrammatic front elevations of the tool-engaging portion of a gripping member illustrating the way in which it is constructed.
Figure 4:
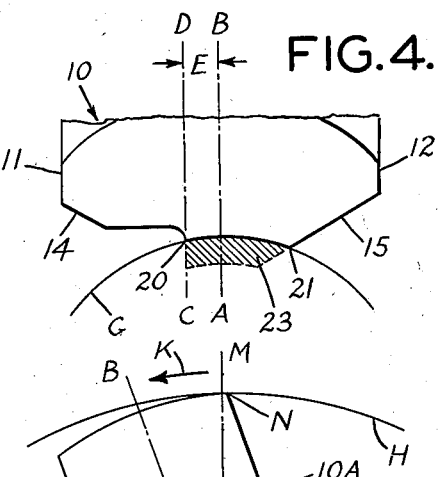

To overcome this difficulty, one side of the member if formed with a flat surface in a plane represented by the line C—D in Figs. 3 and 4 parallel with and at a fixed distance E from the radial plane A—B. This may be accomplished by cutting away a portion of the gripping member on a plane represented by the line C—D. Then the aforesaid grinding may be anywhere between a minimum represented by the arc F in Fig. 3, and a maximum represented by the arc G in Fig. 4, without changing the distance E. In both cases the arcs F and G are equal and represent the radius of a grinding tool. The shaded portions 22 and 23 bounded by dotted lines in Figs. 3 and 4 represent the tolerance of grinding which may be made without changing the distance E, when the surface on the line C—D is made by cutting away a part of the gripping member. In any case, the grinding will form an arcuate surface terminating in lines 20, 21. Line 20 forms a sharp gripping edge. These gripping edges, in each of several simultaneously ground gripping members, will therefore be equally distant from radial planes through the gripping members and equally distant from the axis of the collet regardless of the amounts represented by the shaded portions 22, 23 which are ground off of them.

Figure 5:
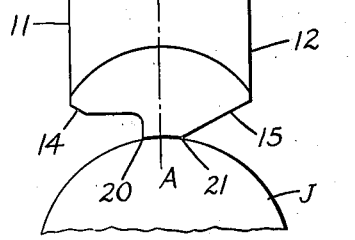
Fig. 5 is an enlarged diagrammatic front elevation of a gripping member which embodies this invention, interposed between a cam surface and the shank of a tool.

Fig. 5 illustrates graphically a gripping member constructed as thus described pressed between a cam surface represented by the arc H, and a shank J of a tool. When the cam member is turned in an anti-clockwise direction, as indicated by the arrow K in Fig. 6, the gripping member will be tilted out of its radial position as a result of the torque produced by the resistance of the shank J to turning, caused by the tool's engagement with a workpiece, toward the position in which it is shown at 10A in Fig. 6. This produces a toggle action, which increases as the sharp gripping edge 20 approaches the line L—M, which passes through the axis of the collet and near a point N on the line of contact between the gripping member and the cam surface H. The edge 20 and the point N are on opposite sides of the radial plane A—B. The toggle action thus effected tends to force the edge 20 of the gripping member into the surface of the shank J.

As the gripping edges 20 of the gripping members are equi-distant from axial planes through the gripping members and from the axis of rotation, as previously described, their pressure on the shank is equalized and the shank will be held concentrically with uniform toggle pressure and thus meets the requirements of precision work. It will be noted that this desired effect is greater on shanks of larger diameter, where it is most needed, than it is on small shanks.

Figure 6:
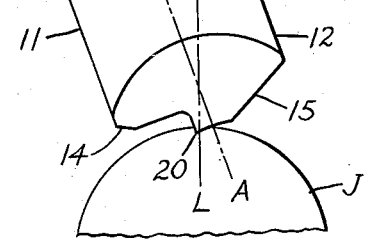
Fig. 6 is a view similar to Fig. 5, showing the gripping member in a different position from that in which it is shown in Fig. 5.

In developing this invention I have found that the distance E of the plane C—D from the plane A—B of the gripping member can be determined for the maximum torque which will be produced on a shank of known diameter and hardness, and that this distance may be such that the desired torque effect may be attained without moving the gripping edge 20 to the right, as viewed in Fig. 6, beyond the dead-center line L—M of the toggle.

Figure 7:
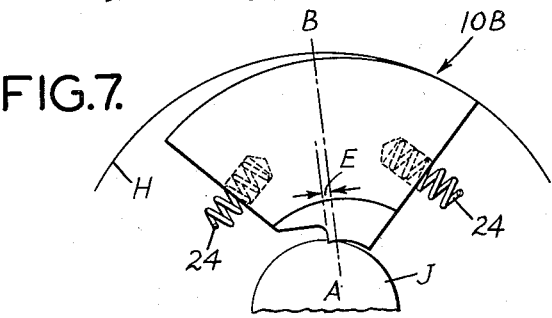
Fig. 7 is a diagrammatic front elevation of a gripping member of a different type which is constructed in accordance with the present invention.

In Fig. 7 I have shown this invention applied to a gripping member 10B of another type. In this case the inner portion of the gripping edge is cut away from its medial plane A—B a distance represented by E. The gripping member, as in the former case, is interposed between a cam surface H and the shank J of a tool. In collets having gripping members of the form shown in Fig. 7, they are interconnected by springs 24.

Various modifications in construction, mode of operation, method and use of an invention may and do occur to others, especially after benefiting from knowledge of such a disclosure as that herein presented of the principles involved, but the invention itself is not confined to the present showing.

I claim:
1. A collet of the type which comprises at least three gripping members of rigid material angularly spaced about a common axis, in which each of said members has a gripping surface with an edge formed by the intersection of said surface with a side in a plane equally offset laterally from said axis and from the intersection of said surface by an axial plane.

2. A collet of the type which comprises at least three gripping members of rigid material angularly spaced about a common axis, in which each of said members has a gripping surface with a sharp edge formed by the intersection of said surface with a side in a plane laterally offset at a predetermined fixed distance from said axis and from the intersection of said surface by an axial plane.

3. A collet of the type which comprises at least three gripping members of rigid material angularly spaced about a common axis, in which each of said members has an arcuate gripping surface with a sharp edge formed by the intersection of said surface with a side in a plane laterally offset at a predetermined fixed distance from said axis and from the intersection of said surface by an axial plane and parallel with said axial plane.

4. A collet of the type which comprises at least three gripping members of rigid material having flat sides, angularly spaced about a common axis, in which the inner portion of each member has an arcuate gripping surface formed between two flat surfaces converging toward the axis to a line intermediate said sides and parallel with said axis, said gripping surface having an edge formed by the intersection with said gripping surface of a side in a plane spaced at a predetermined fixed distance from and parallel with an axial plane passing through said line of convergence.

5. The herein disclosed method of making a collet, which consists of forming a flat side on a like portion of each of a cooperating set of gripping members, maintaining at least three of such gripping members thus formed in radially disposed angularly spaced positions about a common axis, with said flat sides lying in planes spaced at the same predetermined fixed distance from and parallel with planes passing through said axis and through like parts of said members, and forming gripping surfaces on the parts of said members through which said axial planes pass, by removing parts of the inner portions of the members which are equi-distant from the common axis, thereby forming edges parallel with said common axis on lines at the intersections of said gripping surfaces and said flat surfaces which are equally distant from their respective axial planes, regardless of the amount of the parts of the inner portions thus removed.

ARTHUR MERRICK STONER.

REFERENCES CITED

The following references are of record in the file of this patent:

UNITED STATES PATENTS

| Number | Name | Date |
|---|---|---|
| 1,594,515 | Bruhn | Aug. 3, 1926 |
| 1,743,116 | Cook | Jan. 14, 1930 |
| 2,346,706 | Stoner | Apr. 18, 1944 |
| 2,346,707 | Stoner | Apr. 18, 1944 |